United States Patent [19]

Kraft

[11] 4,283,182
[45] Aug. 11, 1981

[54] HYDRAULIC BELT TENSIONER CONSTRUCTION

[75] Inventor: Derald H. Kraft, Canton, Ohio

[73] Assignee: Dyneer Corporation, Westport, Conn.

[21] Appl. No.: 63,205

[22] Filed: Aug. 3, 1979

[51] Int. Cl.³ .............................................. F16H 7/12
[52] U.S. Cl. ..................................................... 474/110
[58] Field of Search ............... 74/242.1 PP, 242.11 C, 74/242.11 R, 242.14 R, 242.15 R; 474/110, 104

[56] References Cited

U.S. PATENT DOCUMENTS

| | | | |
|---|---|---|---|
| 2,051,488 | 8/1936 | Kottlowski et al. | 74/242.11 E |
| 2,703,019 | 3/1955 | Burawoy | 72/242.11 A |
| 2,843,431 | 7/1958 | Beaufort | 74/242.1 FP |
| 2,887,342 | 5/1959 | Helsel, Sr. | 74/242.1 FP |
| 2,893,255 | 7/1959 | Bayliss | 74/242.8 |
| 3,132,596 | 5/1964 | Dinger | 74/242.15 X |
| 3,142,193 | 7/1964 | Polko et al. | 74/242.11 R |
| 3,413,866 | 12/1968 | Ford | 74/242.11 R |
| 3,631,734 | 1/1972 | Wagner | 74/242.11 R |
| 3,768,324 | 10/1973 | Vanderstegen-Drake | 74/242.15 R |
| 3,812,733 | 5/1974 | Yoshida | 74/242.11 S |
| 3,826,149 | 7/1974 | Freese | 74/242.8 |
| 3,924,483 | 12/1975 | Walker et al. | 74/242.11 R |
| 3,965,768 | 6/1976 | Foster | 74/242.15 R |
| 3,975,965 | 8/1976 | Speer | 74/242.15 R |
| 3,986,407 | 10/1976 | Naggert | 74/242.1 FP |
| 4,077,272 | 3/1978 | Busso | 74/242.1 FP |
| 4,094,205 | 6/1978 | Cook | 74/242.1 FP |
| 4,144,772 | 3/1979 | Brackin et al. | 74/242.15 R |

Primary Examiner—C. J. Husar
Assistant Examiner—Conrad Berman
Attorney, Agent, or Firm—Frease & Bishop

[57] ABSTRACT

A hydraulic tensioning device and arrangement which maintains a predetermined amount of tensioning force on an endless drive belt of the vehicle accessories drive system. A hydraulically actuated piston applies a predetermined force to one of the vehicle accessories which is pivotally mounted with respect to the engine to tension the drive belt which is drivingly connected to this vehicle accessory. A self-contained hydraulic fluid supply and pump assembly is mounted in a fixed position on the vehicle engine and has a fluid pressure line connected to the piston for hydraulic actuation of the piston. An idler pulley is rotatably mounted on the fluid supply and pump assembly and is engaged with and driven by the drive belt for actuating the pump to supply hydraulic fluid from the fluid supply to the piston. A coil spring mounted within the piston cylinder applies a portion of the tensioning force on the belt tensioning accessory with the major portion of the tensioning force being applied hydraulically. Check valves regulate the amount of hydraulic force which is applied to the piston and ultimately to the belt by controlling the flow of hydraulic fluid to and from the piston.

19 Claims, 9 Drawing Figures

HYDRAULIC BELT TENSIONER CONSTRUCTION

BACKGROUND OF THE INVENTION

1. Field of the Invention

The invention relates to belt tensioning devices and arrangements, and in particular to hydraulically actuated belt tensioning devices for use with the endless drive belts of the drive systems for vehicle accessories. More particularly, the invention relates to a belt tensioner having an improved self-contained hydraulic fluid supply and pump assembly operated by an idler pulley mounted thereon and driven by the endless belt to maintain a predetermined constant tensioning force on the endless drive belt regardless of the engine operating condition by pivotal movement of one of the vehicle accessories.

2. Description of the Priot Art

There is the trend today in the automobile industry to operate the various vehicle accessories, such as the power steering pump, oil and air pumps, air conditioning and alternator, by a single endless belt driven by a pulley connected to the engine crankshaft. This system is referred to as a "serpentine" drive belt system. To insure optimum operating efficiency for these various accessories, it is necessary that the drive belt be maintained at a predetermined tension to assure efficient performance of the accessories as well as satisfactory service life for the belt. Due to the relatively greater length for the single drive belt which replaces the heretofore plurality of smaller belts, there is a greater tendency for the belt to stretch, which will affect the operating characteristics of the driven accessories. Therefore, it is desirable that an automatic belt tensioning device be used for these endless belts to provide reliable service over an extended period of time and to maintain a constant amount of tension thereon regardless of the amount of belt stretch without requiring any maintenance or manual adjustment.

Numerous devices have been proposed and used to accomplish this purpose. One type of tensioner uses a bushing formed of an elastomeric material which is placed in compression by some mechanical means for continuously exerting a tensioning force on the belt. Examples of these constructions are shown in U.S. Pat. Nos. 3,975,965 and 4,144,772. These tensioner constructions, which use an elastomeric material, have the disadvantages in that the high load rate which they exert on the belt results in the rapid loss of tensioning as the belt stretches, and this load rate limits the stroke of the belt-engaged idler pulley to a shorter distance than desired. Also, sudden acceleration and deceleration of the drive belt can cause a whipping action to occur which creates a time lag before full damping is achieved.

Numerous other types of belt tensioning devices use springs for applying and/or maintaining the entire tensioning force on a belt-engaging idler pulley or chain-engaging sprocket. Some examples of these types of constructions are shown in U.S. Pat. Nos. 2,703,019, 2,893,255, 3,413,866, 3,631,734, 3,768,324, 3,812,733, 3,924,483 and 3,965,768. Some of these various spring-actuated devices use the biasing force of the spring in combination with hydraulic actuated members for regulating the amount of tensioning force applied to the belt, depending on whether the engine is running or shut off. U.S. Pat. No. 2,051,488 shows a chain tensioning device in which a hydraulic cylinder is actuated when the engine is running to reduce the tensioning pressure which is exerted on the drive chain by a biasing spring. This hydraulic cylinder applies a counter force to the biasing action of the spring when the engine is running in order to decrease the tensioning force on the chain, whereupon the full biasing force of the spring is exerted on the chain when the engine is off and the hydraulic cylinder inactive. U.S. Pat. No. 3,142,193 discloses another belt tensioner using a hydraulically actuated bellcrank and belt-engaging pulley in which a spring biases the pulley into tensioning engagement with the belt until the engine is operating, whereupon the hydraulic actuated piston imparts a greater tensioning force to the pulley through the bellcrank. When the engine stops, the piston retracts and the spring maintains a lesser tensioning force on the belt. U.S. Pat. No. 4,077,272 discloses another belt tensioner using both a spring and a hydraulic member to achieve the desired tensioning characteristics. In this device, when the engine is running, hydraulic oil from the engine lubricating system forces a piston back into its cylinder to overcome an internally mounted first spring so that only a second spring acts on the belt tensioning pulley when the engine is operating. When the engine is off, both springs act on the belt tensioning pulley. U.S. Pat. No. 3,132,596 shows a belt tensioner using a hydrostatic snubber controlled by the power steering pump of the vehicle, whereupon the snubber is forced outwardly in direct relationship to the output pressure of the power steering pump. This mechanism does not maintain a constant pressure on the belt when the vehicle engine is both on and off, and will apply different forces in relationship to the engine speed.

Many of these devices are believed to perform satisfactorily for their intended purpose. However, the use of springs for effecting the entire tensioning force on a drive belt or chain, either for applying or retracting a tensioning member therefrom, presents problems. The operating characteristics of these springs will change over the life of the spring and even in response to changes in ambient temperature. Also, as the drive belt stretches, the spring's biasing effect changes, making it difficult to maintain a constant tensioning force on the drive belt. Likewise, the springs may become rusted and corroded and break during the life of the vehicle, presenting mechanical maintenance problems for the vehicle owner.

Many of these problems are believed to be eliminated by the improved hydraulic belt tensioner constructions shown in a copending application of Nolte V. Sproul, Ser. No. 058,362, filed July 18, 1979, and my copending application, Ser. No. 060,903, filed July 28, 1979, both assigned to the same assignee as is the present application. These improved belt tensioners are operated by hydraulic pressure exerted by fluid from the vehicle engine, such as the relatively low fluid pressure of the engine's oil lubricating system or the high fluid pressure developed by the power steering pump of the vehicle.

However, some vehicle manufacturers prefer not to use the hydraulic fluid which is used for other purposes in the engine, such as lubricating or power steering, for the operation of the belt tensioner. This presents a possible problem situation in that if a serious leak occurs, it could affect the other operations of the vehicle and possibly damage or ruin an engine if not detected soon enough.

Accordingly, it is desirable to provide a belt tensioning device and arrangement which eliminates the use of springs for controlling the entire belt tensioning force, which device will maintain a nearly constant predetermined tension on the belt throughout the belt life and regardless of whether the engine is on or off or being driven at high or low speeds, and which device uses a source of hydraulic fluid completely independent of the vehicle hydraulic system for operation thereof.

There is no known belt tensioning device or arrangement of which I am aware which imparts and maintains a nearly constant predetermined tensioning force on an endless accessory drive belt by a hydraulic piston which is actuated by hydraulic fluid from a self-contained fluid supply reservoir completely independent of the vehicle hydraulic fluid system, and which maintains this constant pressure on the belt whether the engine is on or off or operating at various speeds, and which prevents belt whip and achieves a highly efficient damping effect.

SUMMARY OF THE INVENTION

Objectives of the invention include providing a hydraulic belt tensioner construction which is actuated from a source of hydraulic fluid completely separate and independent of the vehicle accessory drive system and at a predetermined pressure regardless of the operating condition of the vehicle's engine. Another object is to provide such a belt tensioner which uses a hydraulic piston for pivotally moving one of the vehicle accessories to tension the drive belt which is engaged therewith, and in which a check valve system prevents the escape of hydraulic fluid from the piston cylinder to maintain constant pressure on the piston, thereby providing a damping effect and eliminating belt whip upon starting and stopping of the vehicle engine or upon rapid engine acceleration or deceleration. A further object is to provide such a belt tensioner in which a coil spring is mounted within the cylinder of the hydraulic piston and biases the piston rod outwardly from the cylinder, and wherein the tensioning force exerted by the piston on the pivotally mounted accessory is provided partially by the mechanical force of the spring with the major portion of this tensioning force being exerted hydraulically. Still another object is to provide such a belt tensioner in which the spring ensures a sufficient tensioning force on the belt to provide a driving engagement with the various accessories even upon the loss of hydraulic pressure in the cylinder, while overcoming the disadvantages of the use of springs for exerting the entire force, as in prior tensioner constructions. Also, it is an object to provide a belt tensioner which has a self-contained supply of hydraulic fluid which is separate from the engine lubricating fluid or power steering fluid, and in which this fluid is pumped into the cylinder of the tensioning piston by a relatively inexpensive gear pump mechanism driven by the endless drive belt of the accessory drive system. It is another object to provide a belt tensioner in which the hydraulic cylinder and piston rod are relatively simple and inexpensive components formed from sheet metal tubing, which are extremely lightweight, and which form a piston having a minimum number of parts. It is another object of the invention to provide a belt tensioner which is of a relatively simple construction, which eliminates maintenance and repair problems, which achieves the stated objectives in a simple, effective and relatively inexpensive manner, and which solves problems and satisfies needs existing in the art.

These objectives and advantages are obtained by the improved hydraulic belt tensioner construction for automatically tensioning an endless belt of the drive system for the vehicle accessories, in which one of the vehicle accessories is pivotally mounted with respect to the vehicle engine and operatively engaged with and driven by the endless belt, wherein the general nature of the belt tensioner may be stated as including self-contained hydraulic fluid supply and pump means adapted to be mounted in a fixed position with respect to the vehicle engine. An idler pulley is drivingly engaged with the fluid supply and pump means for actuation of said pump means upon rotation of said pulley, with said pulley being adapted to be operatively engaged with and driven by the endless drive belt. Also, piston means is operatively connected to the fluid supply and pump means for hydraulic actuation of said piston means, and the piston means is adapted to be operatively engaged with the vehicle accessory for pivotally moving said accessory to tension the drive belt engaged therewith upon actuation of the pump means by the idler pulley.

BRIEF DESCRIPTION OF THE DRAWINGS

A preferred embodiment of the invention—illustrative of the best mode in which applicant has contemplated applying the principles—is set forth in the following description and shown in the accompanying drawings and is particularly and distinctly pointed out and set forth in the appended claims.

Similar numerals refer to similar parts throughout the drawings.

DESCRIPTION OF THE PREFERRED EMBODIMENT

Figure 1:
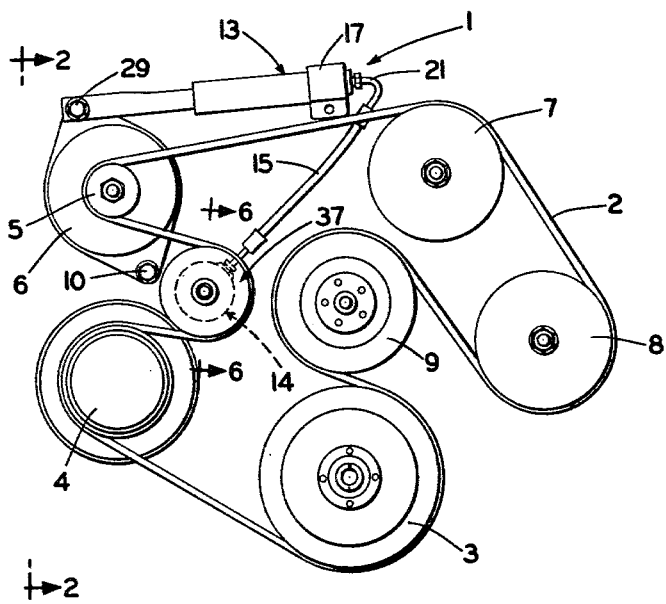
FIG. 1 is a diagrammatic view looking toward the front of an engine illustrating an endless drive belt operatively engaged in a driving relationship with the vehicle accessories with the improved belt tensioner construction incorporated therein.
Figure 2:
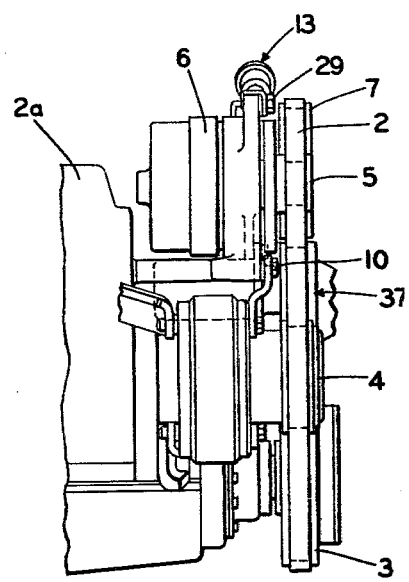
FIG. 2 is a fragmentary left-hand end view of the engine and drive belt system, looking in the direction of arrows 2—2, FIG. 1.

Referring to FIG. 1 of the drawings, the improved belt tensioner construction is indicated generally at 1, and is shown tensioning an endless drive belt 2 of a power transmission belt drive system for the vehicle accessories. The drive system consists of a plurality of belt pulleys or sheaves having configurations and diameters determined by their associated engine accessories and locations relative to each other. The various pulleys are supported on their respective engine components which are mounted on an engine 2a in a usual manner known in the art. Preferably, belt 2 operates in a single vertical plane, which eliminates binding and skewing of drive belt 2, as shown in FIG. 2.

The engine accessories drive system consists of a main driving pulley 3 which is operatively connected to the main shaft of the engine, a pulley 4 which is operatively connected to the air conditioning motor, a pulley 5 which is operatively connected to an alternator 6 which provides the electrical power for the engine, a pulley 7 which is operatively connected to the engine air pump, a pulley 8 which is operatively connected to the vehicle's power steering unit, and a pulley 9 which is operatively connected to the engine water pump. Alternator 6 is pivotally mounted by a bottom bolt 10 and is moved in a counterclockwise direction by improved belt tensioner 1 for applying a tensioning force on belt 2 through its engagement with pulley 5 of alternator 6.

Tensioner 1 includes as main components a hydraulic piston and a self-contained fluid supply and pump assembly, indicated generally at 13 and 14, respectively. These components are hydraulically connected by a section of flexible conduit 15.

Figure 3:
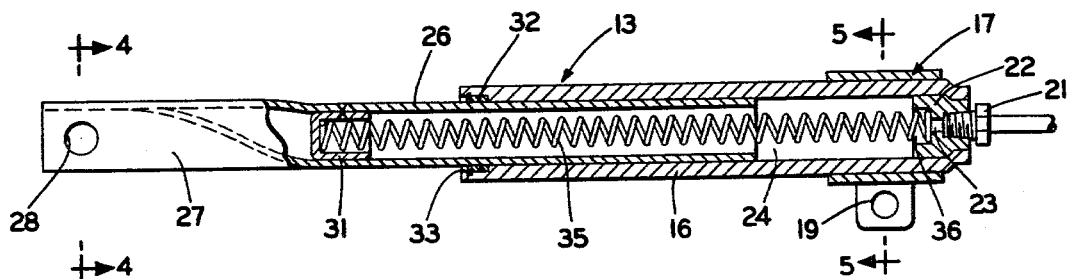
FIG. 3 is an enlarged view of the hydraulic cylinder and associated piston rod of the improved belt tensioner construction of FIG. 1, with portions broken away and in section.
Figure 4:
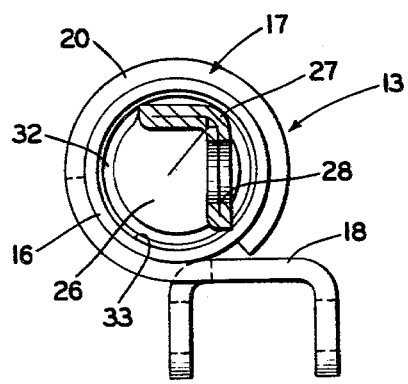
FIG. 4 is an enlarged sectional view taken on line 4—4, FIG. 3.
Figure 5:
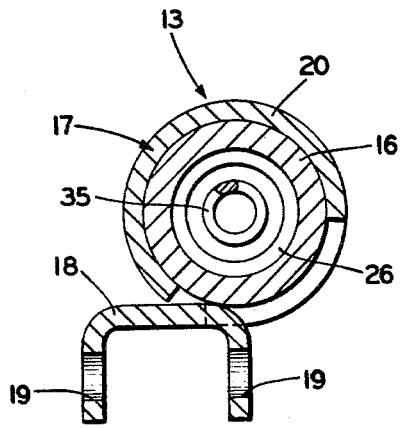
FIG. 5 is an enlarged sectional view taken on line 5—5, FIG. 3.

Hydraulic piston 13, shown particularly in FIGS. 3-5, includes a tubular-shaped cylinder 16 which is adapted to be pivotally mounted on engine 2a by a bracket 17. Bracket 17 includes a U-shaped base 18 having a pair of pivot pin-receiving holes 19 formed therein and an annularly curved top portion 20 which is clamped about cylinder 16. Conduit 15 is connected to one end of cylinder 16 by a rigid coupling 21 which is threadably engaged in an end plug 22 which seals the outer open end of cylinder 16 (FIG. 3). An opening 23 is formed axially through end plug 22 and provides a fluid passage with a hydraulic fluid chamber 24 formed within cylinder 16.

A piston rod 26 is slidably mounted within the open front end of cylinder 16, and in accordance with one of the features of the invention is formed of an inexpensive cylindrical hollow tube. Outer end 27 of the tube is crimped to form a closed L-shaped cross-sectional configuration, as shown in FIGS. 3 and 4. A hole 28 is formed in piston rod end 27 for receiving a pivot bolt 29. Bolt 29 connects piston rod 26 to the upper end of the alternator bracket for pivotally moving alternator 6 about its lower pivot bolt 10 (FIG. 1) in a counterclockwise direction to tension belt 2. A cup 31 is welded or brazed within the forward end of piston rod 26 adjacent the start of the crimped end 27 to provide a fluid seal for the outer end of the hollow rod interior. A sealing ring 32 is mounted within an annular recess 33 formed in the outer open end of cylinder 16 to provide a seal between cylinder 16 and piston rod 26.

A coil spring 35 is located within the hollow interior of piston rod 26 and cylinder 16, with one end being seated within sealing cup 31 and the opposite being seated within an annular recess 36 formed in the inner end of end plug 22 and concentric with end opening 23. Spring 35 is selected so that it exerts a predetermined biasing force on piston rod 26 to bias the same outwardly from within cylinder 16. Piston rod 26 through the biasing effect of spring 35, exerts a predetermined mechanical tensioning force on belt 2 by the pivotal movement of alternator 6, in a manner as shown in FIG. 1, prior to any hydraulic fluid being supplied to chamber 24.

Figure 6:
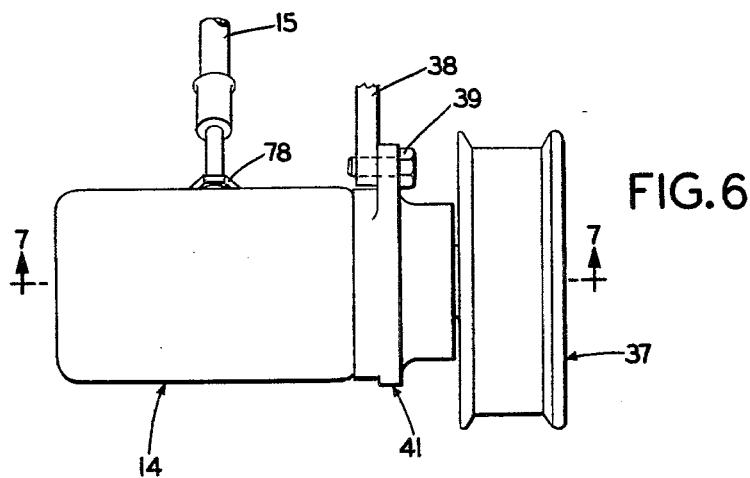
FIG. 6 is a side elevational view of the self-contained hydraulic fluid supply and pump assembly with the idler pulley mounted thereon, looking in the general direction of arrows 6—6, FIG. 1.

In accordance with another of the main features of the invention, the self-contained hydraulic fluid supply and pump assembly 14 is mounted in a fixed position on engine 2a and has an idler pulley 37 rotatably mounted thereon which is engaged with and driven by belt 2. Assembly 14 is shown particularly in FIGS. 7 and 8, and is mounted on engine 2 by a bracket arm 38 (FIG. 6) which is attached by bolt 39 to assembly 14.

Assembly 14 includes a generally cylindrically shaped bearing housing 41 having a central bore 42. A bearing 43 is mounted within bore 42 by a front retaining ring 44 which clamps bearing 43 against a rear annular shoulder 45. Idler pulley 37 includes a usual, preferably sheet metal, belt-engaging pulley member 47 which is mounted in a fixed relationship on the outer end of a shaft 48 for rotation therewith. The inner end of shaft 48 is rotatably mounted within bearing 43 and secured therein by an inner retaining ring 49 and an outwardly spaced collar 50 which abuts against bearing 43.

A gear pump assembly 52 is mounted on the inner wall surface of bearing housing 41 by a plurality of circumferentially spaced bolts 53. Pump assembly 52 includes a generally disc-shaped gear-mounting block 54 and a pair of pump gears 55 and 56 rotatably mounted within a central recess 51 formed in block 54 by stub shafts 57 and 58, respectively. Gears 55 and 56 are enclosed within recess 51 by an end sealing plate 59.

Gear 55 is the driving gear of the gear pump pair and is attached to stub shaft 57 for rotation therewith. Shaft 57 has a reduced end 60 which is splined in a complementary hole formed in the inner end of pulley shaft 48, whereby rotation of pulley shaft 48 will drive gear pump shaft 57 and correspondingly gear 55. Shaft 48 is rotated by the engagement of endless drive belt 2 with pulley member 47. Gear stub shaft 58 is freely rotatably mounted within an opening 61 formed in gear mounting block 54, enabling pump gear 56 to be driven by and in unison with driving gear 55. Gear pump assembly 14 may have other configurations than the two-shaft, externally meshing gear arrangement described above without affecting the concept of the invention. Pump assembly 14 is a readily available and known structure which provides a source of fluid pressure from a fluid supply reservoir.

A check valve assembly 62 is mounted on gear mounting block 54 by a plurality of spaced bolts 64 which clamp assembly 62 against end sealing plate 59 of gear pump assembly 52. Check valve assembly 62 preferably is formed from a rigid block of material 63, such as metal or plastic. A pair of ball check valves 65 and 66 are formed in valve block 63 to control the flow of hydraulic fluid into piston 13, and correspondingly to regulate the amount of hydraulic pressure exerted on piston rod 26 for tensioning of belt 2. Check valves 65-66 include cavities 67 and 68 containing valve balls 69 and 70 which are biased toward seated position by springs 71 and 71a, respectively. Check valves 65-66 may be of another type of arrangement, if desired, without affecting the concept of the invention.

In accordance with another feature of the invention, assembly 14 includes its own hydraulic fluid system for supplying the hydraulic pressure and fluid to cylinder 13, completely eliminating the need for using hydraulic fluid from any part or component of the vehicle. A cylindrical-shaped fluid reservoir housing 72, preferably formed of plastic or sheet metal, is mounted on bearing housing 41 by various types of attachment means, such as the use of rolled outer end edges 73 seated within an annular groove 74 formed in the outer surface of bearing housing 41. An annular seal 75 then is mounted within a corresponding annular groove 77 to provide a fluid seal between the cylindrical wall of housing 72 and the outer surface of bearing housing 41.

A supply of hydraulic fluid, such as oil 76 (FIG. 7), is contained within fluid housing 72. Housing 72 preferably will contain sufficient fluid, due to the closed loop arrangement of assembly 14, to eliminate replenishing or refilling housing 72 at any time throughout the life of belt tensioner 1. Housing 72 also may be attached to valve block 63 (FIG. 8) by a threaded coupling 78 of fluid conduit 15. Coupling 78 is threadably engaged with a boss 79 formed on the outer surface of fluid housing 72 and in a corresponding threaded opening 80 formed in check valve block 63 to clamp fluid housing 72 and block 63 tightly together.

Figure 7:
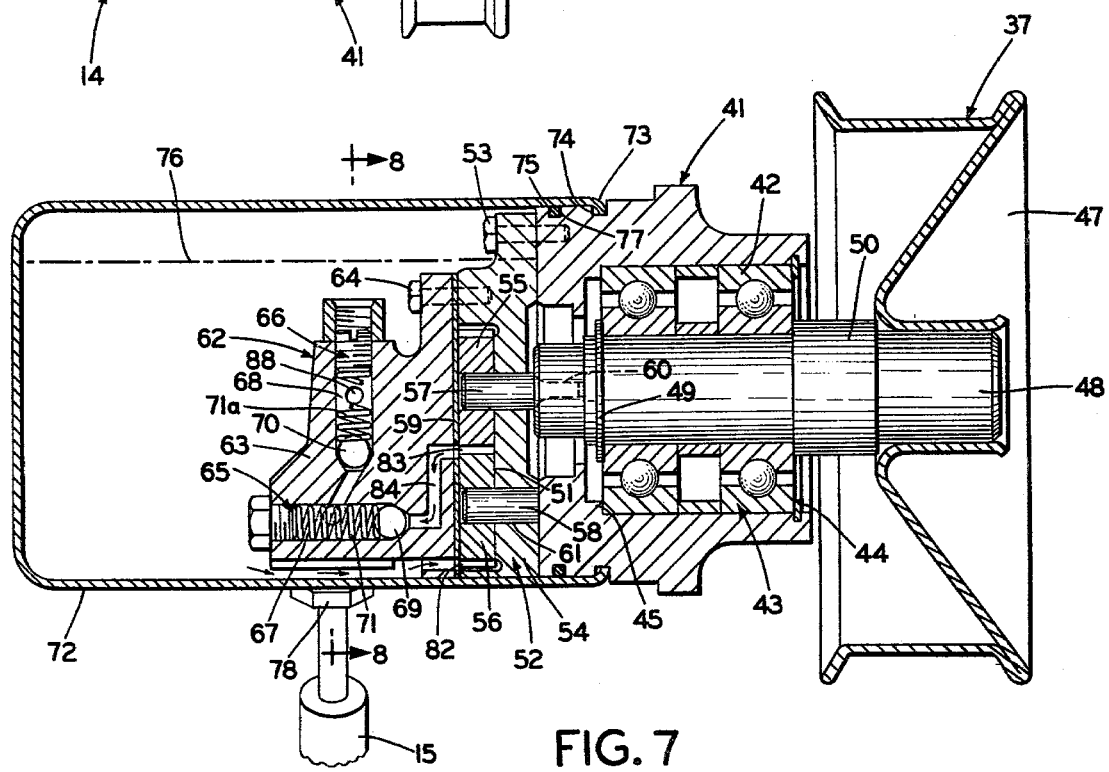
FIG. 7 is an enlarged sectional view of the improved fluid supply and pump assembly and idler pulley combination, taken on line 7—7, FIG. 6.
Figure 8:
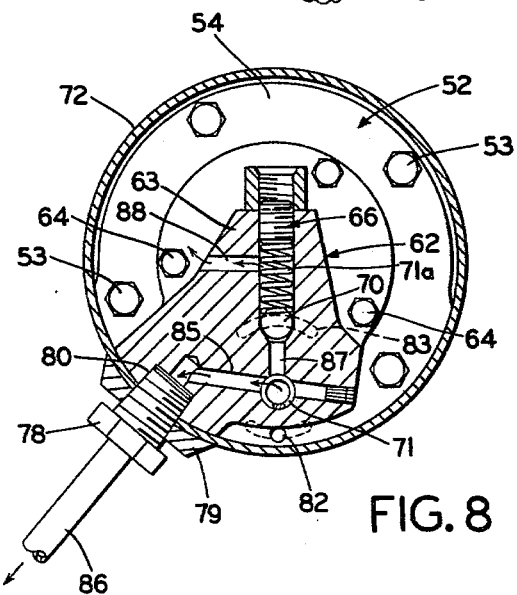
FIG. 8 is a vertical sectional view taken on line 8—8, FIG. 7.

A hydraulic fluid inlet opening 82 is formed in the lower portion of end sealing plate 59 and communicates with pump gear 56. The incoming low-pressure hydraulic fluid from oil supply 76 enters gear pump assembly 52 through opening 82 and is discharged with a higher pressure through a high-pressure opening 83 and into a fluid passage 84 formed in valve block 63. This high-pressure oil easily unseats check valve ball 69 of check valve 65 and flows through an outlet passage 85 and into a tube 86 of threaded coupling 78. This high-pressure oil then enters chamber 24 of piston 13 to force piston rod 26 outwardly in a belt-tensioning direction. High-pressure discharge passage 85 is connected to check valve 66 by a fluid bypass passage 87 (FIGS. 7 and 8). Check valve spring 71a has a predetermined biasing force on valve ball 70 so that as long as the predetermined hydraulic pressure is exerted on piston rod 26 within cylinder 13, the high-pressure oil produced by gear pump assembly 52 will lift ball 70 from its closed seated position, enabling this oil to flow through relief passage 87 and into cavity 68. This oil then flows through a by-pass return passage 88 and into oil supply 76 for recycling through gear pump assembly 32. This closed loop system thereby ensures continuous source of high-pressure hydraulic fluid provided by pump assembly 52, which is applied to piston rod 26 and subsequently to alternator 6 for tensioning belt 2.

Figure 9:
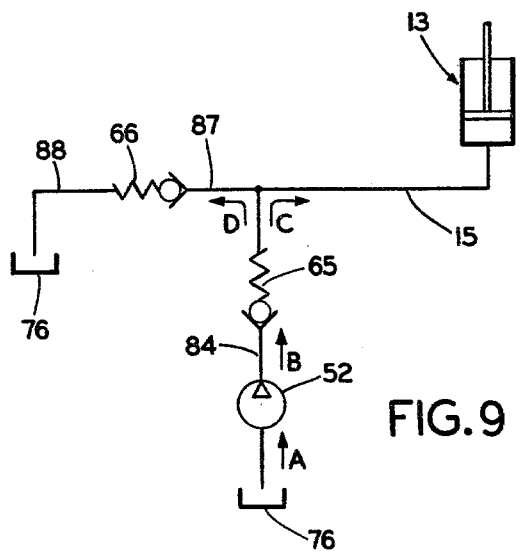
FIG. 9 is a schematic diagram of the hydraulic system of the fluid supply and pump assembly and actuator piston of FIG. 1.

FIG. 9 is a schematic drawing of the check valve and hydraulic fluid system discussed above, with the various numerals used in FIG. 9 corresponding to the numerals of the components described above and shown particularly in FIGS. 7 and 8. Low-pressure oil is drawn from fluid supply 76 (Arrow A) and is expelled by pump pressure 52 as high-pressure fluid (Arrow B) which flows through passage 84 and through check valve 65. This flow of high-pressure fluid (Arrow B) will then flow either into piston 13 through conduit 15 (Arrow C) or if no additional hydraulic fluid is required will flow through relief passage 87 and through check valve 66 (Arrow D) and through bypass return passage 88 back into fluid supply 76.

The operation of improved belt tensioner construction 1 is as follows. The amount of tensioning force which is necessary for proper tensioning of belt 2 by movement of alternator 6 is determined by various standard calculations and past experience. This force then is used to determine the corresponding outward force required to be exerted by piston rod 26. Coil spring 35 then is selected so that approximately one-third of the total force to be exerted by piston rod 26 will be the result of the biasing action of spring 35, with the remaining two-thirds of this force being exerted hydraulically on rod 26.

For example, assume that a 300 pound force is desired to be exerted by piston rod 26. Spring 35 will be chosen so as to exert a force of approximately 100 pounds. Check valve spring 71a then is chosen or adjusted in valve block 63 due to its threaded engagement therewith, so as to become unseated and move upwardly to an open position when the pressure exceeds the predetermined fluid pressure necessary to produce a 200 pound hydraulic force on piston rod 26, which when combined with the spring force, provides the required 300 pound force on alternator 6. Opening of check valve 66 enables high-pressure fluid from pump assembly 52 to return to fluid supply 76 through passage 88. Thus, high-pressure fluid discharged by pump assembly 52 will continue to flow into piston chamber 24 through check valve 65 and conduit 15 until the desired pressure is reached, whereupon any additional high-pressure fluid discharged from pump assembly 52 will unseat valve ball 70 with the excess oil returning to supply 76.

Should any oil leak from piston 13, it will immediately be made up during operation of the vehicle engine. During engine operation, pulley 37 is rotated by belt 2 which rotates gear shaft 57 through its splined engagement with pulley shaft 48 to pump additional make-up hydraulic fluid into cylinder chamber 24 until the predetermined pressure is achieved, whereupon bypass check valve 66 will open as described above.

Spring 35 ensures that sufficient tensioning pressure is always exerted on belt 2 through pivotal movement of alternator 6 for operation of the vehicle accessories even upon complete loss of hydraulic fluid from piston 13. Therefore, if a serious leak occurs for any reason in the self-contained hydraulic fluid system, the vehicle accessories would still operate when the engine is running. Any make-up fluid required will be applied to chamber 24 immediately upon actuation of pump assemly 52 until the predetermined pressure is reached.

Improved hydraulic belt tensioner 1 and its arrangement and operation with the vehicle accessories and drive belt has a number of advantages. The self-contained hydraulic fluid supply and pump assembly 14 completely eliminates the use of the engine lubricating fluid or the power steering fluid for operation of the tensioning piston as heretofore required in prior constructions. Assembly 14 provides a relatively inexpensive and compact unit which is mounted on the engine at a convenient location in combination with the mounting of piston 13. Another advantage is that spring 35 ensures that sufficient tensioning force is always exerted on belt 2 for operation of the vehicle accessories even upon loss of hydraulic pressure. Also, due to the location of spring 35 within the hydraulic cylinder, it is protected from corrosion or damage as in prior belt tensioners using springs. Furthermore, piston 13 is an extremely inexpensively formed component consisting only of a pair of tubular sleeves which can be fabricated easily from available metal conduits or plastic materials.

The particular check valve arrangement also ensures that the desired amount of hydraulic fluid and pressure is always available at piston 13 since pump assembly 52 continuously creates a supply of high-pressure fluid in chamber 24 during engine operation. This fluid will only be supplied to piston 13 when necessary and usually will flow through check valve 66 back into the fluid supply reservoir. The check valve system also traps the hydraulic fluid in piston 13 and connecting conduit 15 when the engine is shut off. Therefore, piston 13 will continue to exert the full amount of pressure on alternator 6 (both spring and hydraulic force) even when the engine is off and the fluid will not drain from the piston during engine shutoff, as in prior art tensioner constructions. The maintaining of this tensioning force which is produced by the hydraulic pressure on the belt, even when the engine is not running, is desirable to prevent a whipping action from occurring upon engine start up. Also, this trapped hydraulic fluid provides a damping effect at all times to the piston to prevent whipping of the belt during sudden engine acceleration or deceleration.

Improved tensioner construction 1 also enables maintenance to be performed easily on belt 2 or on any of the accessories operated thereby. The hydraulic fluid is drained from piston 13 enabling the spring-biasing tensioning to be easily overcome manually for removal and/or installation of belt 2. This hydraulic fluid will be replaced in piston 13 immediately when the engine is started. Reservoir housing 72 also will contain sufficient oil or other hydraulic fluid to compensate for any minor leakage which could occur in piston 13 or connections therewith, eliminating refilling housing 72 with additional fluid throughout the life of belt tensioner device 1. Also, fluid supply and pump assembly 14 may be mass produced at a sufficiently low cost so as to provide a disposable assembly. Therefore, if replacement is required, the existing assembly would be replaced by a new assembly with a minimum amount of service time and cost and without the need of repairing the existing assembly.

Accordingly, the improved belt tensioner and its arrangement provides a construction which is simplified, effective, safe and inexpensive, which achieves all of the enumerated objectives, provides for eliminating difficulties encountered with prior tensioning devices, and solves problems and obtains new results in the art.

In the foregoing description, certain terms have been used for brevity, clearness and understanding but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details of the construction shown or described.

Having now described the features, discoveries and principles of the invention, the manner in which the improved hydraulic belt tensioner construction is constructed, assembled and operated, the characteristics of the new construction, and the advantageous, new and useful results obtained; the new and useful structures, devices, elements, arrangements, parts, and combinations are set forth in the appended claims.

I claim:

1. A hydraulic belt tensioner construction for automatically tensioning an endless belt of the drive system for vehicle accessories, in which one of the vehicle accessories is pivotally mounted with respect to the vehicle engine and operatively engaged with and driven by the endless belt, said tensioner construction including:

(a) self-contained hydraulic fluid supply and pump means adapted to be mounted in a fixed position with respect to the vehicle engine;
    (b) an idler pulley drivingly engaged with the fluid supply and pump means for actuation of said pump means upon rotation of said pulley, with said pulley being adapted to be operatively engaged with and driven by the endless drive belt; and
    (c) piston means operatively connected to the fluid supply and pump means for hydraulic actuation of said piston means, said piston means being adapted to be operatively engaged with the vehicle accessory for pivotally moving said accessory to tension the drive belt engaged therewith upon actuation of the pump means by the idler pulley.

2. The belt tensioner construction defined in claim 1 in which the self-contained hydraulic fluid supply and pump means is hydraulically connected to the piston means by a flexible conduit.

3. The belt tensioner construction defined in claim 1 in which the idler pulley has a shaft; and in which the fluid supply and pump means includes bearing means rotatably mounting the idler pulley shaft, a pump operatively connected to and driven by the pulley shaft, a plurality of check valves operatively communicating with the pump for regulating the flow of hydraulic fluid from the pump to the piston means, and a hydraulic fluid supply communicating with the pump for supplying fluid to said pump.

4. The belt tensioner construction defined in claim 3 in which the pump is a gear pump having a pair of meshing gears, one of which is drivingly engaged with and rotated by the idler pulley shaft.

5. The belt tensioner construction defined in claim 3 in which the hydraulic fluid supply includes a housing containing a supply of hydraulic fluid; and in which said housing encloses the check valves and pump.

6. The belt tensioner construction defined in claim 3 in which the check valves include first and second one-way ball check valves; in which the first check valve is located between the output of the pump means and a high-pressure discharge opening which communicates with the piston means to trap hydraulic fluid in the piston means, and in which the second check valve is located between the high-pressure discharge opening and a return opening which communicates with the fluid supply, whereby high pressure fluid from the pump will flow back into the fluid supply until additional fluid is required by the piston means.

7. The belt tensioner construction defined in claim 1 in which the piston means includes a hydraulic cylinder mounted in a fixed position and piston rod means telescopically slidably mounted within the cylinder and movable outwardly therefrom by hydraulic fluid in the cylinder; and in which the piston rod means is adapted to be connected to the pivotally mounted vehicle accessory for tensioning the drive belt engaged therewith.

8. The belt tensioner construction defined in claim 7 in which spring means is located within the cylinder and biases the piston rod means outwardly from the cylinder and toward belt tensioning engagement to maintain a predetermined tensioning force on the belt in the absence of hydraulic pressure in the cylinder.

9. The belt tensioner construction defined in claim 8 in which the piston rod means is a hollow sleeve closed on an outer end.

10. An arrangement for tensioning an endless drive belt of a vehicle engine accessories drive system including:
  (a) a vehicle accessory pivotally mounted with respect to the engine and operatively engaged with and driven by the endless drive belt;
  (b) piston means operatively engaged with the vehicle accessory for pivotally moving said accessory in a belt-tensioning direction to tension the drive belt engaged therewith;
  (c) an assembly having a pump and a fluid reservoir mounted on the pump and a supply of hydraulic fluid in the reservoir communicating with the pump;
  (d) conduit means hydraulically connecting the pump with the piston means for hydraulically actuating said piston means to pivot the vehicle accessory toward the belt-tensioning direction; and
  (e) an idler pulley mounted on the pump and fluid reservoir assembly and engaged with and driven by the drive belt, said pulley also being in operative driving engagement with the pump to actuate said pump to supply hydraulic fluid under pressure to the piston means from the reservoir for actuation of said piston means.

11. The arrangement defined in claim 10 in which the pump includes a pair of gears; in which the idler pulley has a shaft; and in which one of the pump gears is operativey connected to the idler pulley shaft for driving said one gear which, in turn, drives the other of said gears to pump fluid from the reservoir into the piston means through the conduit means.

12. The arrangement defined in claim 10 in which check valve means is located within the fluid reservoir and communicates with the pump and fluid supply to regulate the flow of hydraulic fluid from the pump to the piston means.

13. The arrangement defined in claim 12 in which the fluid reservoir is formed by a hollow container; in which the pump and check valve means are located within the container; and in which the conduit means is connected to the check valve means for receiving high pressure fluid from the pump for actuation of the piston means.

14. The arrangement defined in claim 13 in which bearing means is mounted on the container and rotatably mounts the idler pulley for rotation by the drive belt.

15. The arrangement defined in claim 12 in which the check valve means includes a first one-way check valve mounted in a high-pressure discharge passage extending between a high-pressure discharge outlet of the pump and the conduit means; and in which said first check valve permits hydraulic fluid to flow in a direction from said high-pressure discharge outlet of the pump toward and into the conduit means.

16. The arrangement defined in claim 15 in which the check valve means includes a second one-way check valve mounted in a fluid bypass passage which extends between the high-pressure discharge passage and the fluid supply reservoir; and in which said second check valve opens to permit the flow of high-pressure hydraulic fluid from the pump discharge outlet into the supply reservoir when hydraulic pressure and fluid in the piston means are at predetermined levels.

17. The arrangement defined in claim 10 in which the piston means includes a cylinder and a rod telescopically slidably mounted in said cylinder and movable outwardly therefrom in the belt-tensioning direction; and in which spring means is mounted within the cylinder and biases the rod outwardly in the belt-tensioning direction.

18. The arrangement defined in claim 17 in which the spring means applies approximately one-third of the tensioning force and the hydraulic fluid supplies the remaining approximately two-thirds of the tensioning force exerted on the piston rod.

19. The arrangement defined in claim 17 in which the piston rod is a tubular sleeve having an open inner end located with the cylinder and a closed outer end connected to the pivotally mounted accessory; and in which the spring means is a coil spring extending axially within the tubular rod sleeve and cylinder.

* * * * *